Figure 1:
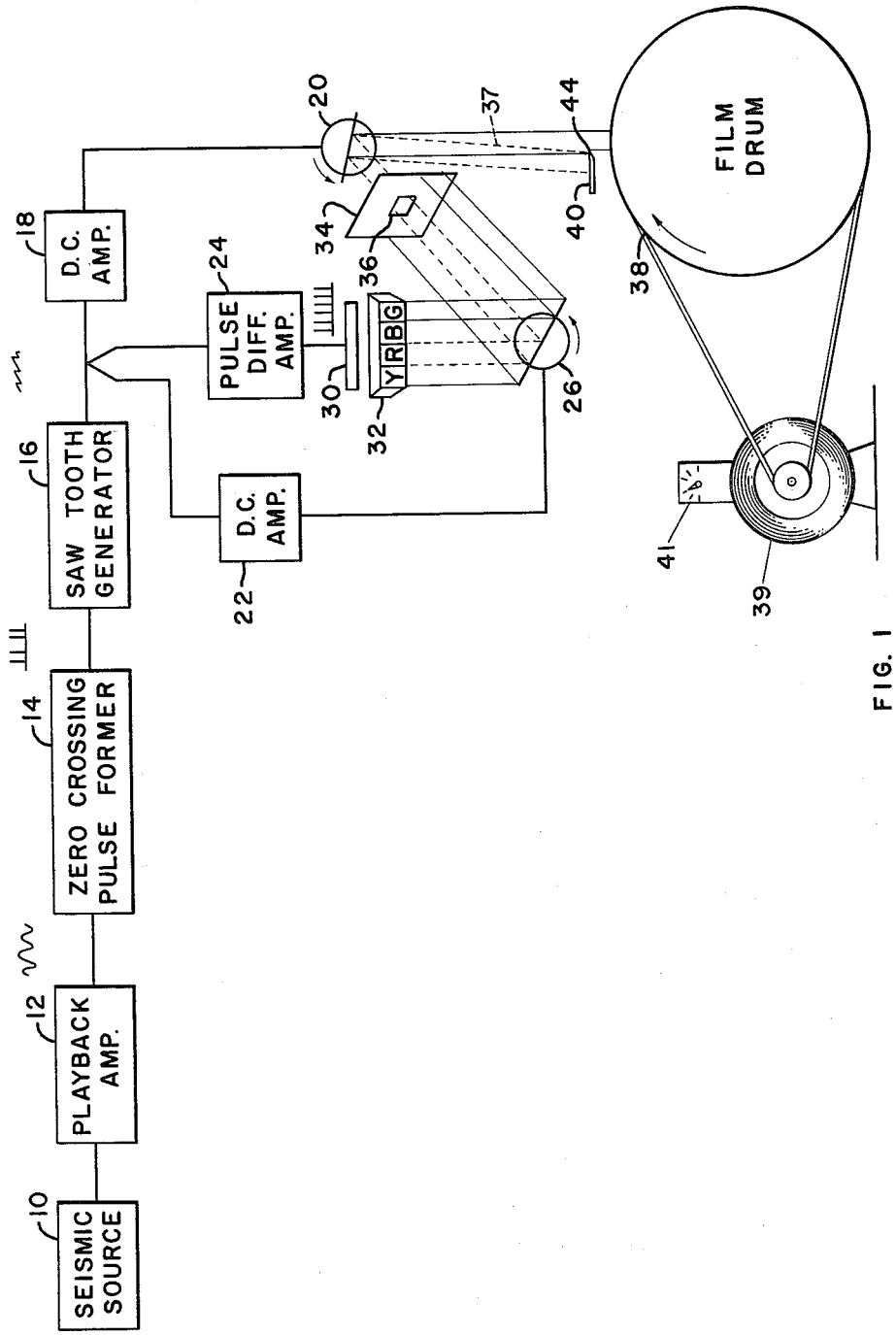

Frank G. Boucher   Inventor
By John D. Gassett   Attorney

Jan. 8, 1963   F. G. BOUCHER   3,072,907
COLOR RECORDING FOR SEISMOGRAM FREQUENCY ANALYSIS
Filed Sept. 15, 1958   2 Sheets-Sheet 2

Frank G. Boucher   Inventor
By John D. Gassett   Attorney

United States Patent Office 3,072,907
Patented Jan. 8, 1963

3,072,907
COLOR RECORDING FOR SEISMOGRAM FREQUENCY ANALYSIS
Frank G. Boucher, Catoosa, Okla., assignor to Jersey Production Research Company, a corporation of Delaware
Filed Sept. 15, 1958, Ser. No. 760,957
16 Claims. (Cl. 346—1)

The present invention concerns an improvement in the systems for recording seismic signals. It particularly relates to a system wherein frequency of seismic signals is automatically determined and recorded in color with a preselected frequency or frequency range being associated with a specific color.

Geophysical prospecting using artificially induced seismic disturbances has found wide application in the search for petroleum and other products. It is the general practice to initiate an explosion or other seismic disturbance at a point near the surface of the earth to direct seismic waves downward into the earth from that point. Waves continue to travel downward within the earth, until they encounter discontinuities in the earth's structure in the form of various subsurface formations and the like. These discontinuities have the effect of reflecting at least a portion of the seismic waves back toward the surface of the earth. By arranging a plurality of geophones or other seismic transducers at spaced distances from the seismic disturbance point, it is possible to detect the arrival of the reflected seismic waves at the surface of the earth. These detected waves are translated to electrical impulses which are then indicative of the character of the ground motion and are usually referred to as a seismic signal which is in effect a composite signal made up of a plurality of electrical signals varying in frequency and amplitude. The electrical signals oscillate by a no-signal zero voltage quiescent point or electric base line.

The usual practice has been to examine the amplitude characteristics of the recording made of the seismic signals by correlating the amplitudes of a plurality of traces on the seismic record. Seismic observers can, by observing such traces, determine the shape of reflected subsurface formations. By accurately recording the time required for the seismic wave to travel to the reflection surfaces and return to the geophone, it is possible to determine the depths to such reflection surfaces.

In the past, it has been the general practice to amplify the seismic signals generated by geophones and to record the signal by means of a suitable camera. The camera may take the form of a recording oscillograph or as is more recently the case, it may take the form of a magnetic photographic recording device capable of recording the signal in reproducible form. It is this amplified record signal with which seismic computers make their study.

Most conventional seismographs, that is devices for recording the seismic signals, are capable of recording up to 24 or more separate seismic signals simultaneously. Thus, if a seismic observation results in 24 seismic signals being generated at as many detection stations, the resulting seismograph is a 24 trace record of the resulting 24 signals. The traces are normally arranged in a side by side relationship. A timing trace indicating predetermined timing intervals is simultaneously recorded with the seismic signals to indicate the amount of time on each trace. Once the seismogram has been made, persons skilled in the art are generally able to determine from the data recorded on the seismogram certain characteristics of the earth's substrata and the vicinity of the seismic observation. The accuracy of exploration by seismic methods depends to a large extent upon the ability of the observer to analyze recorded seismic information. It has been found that variable density records or variable color records in which the signal is reproduced as a photographic trace which varies in intensity, or in color, along its length in proportion to the intensity of the signal are more easily analyzed than other types of records. However, this variable density or variable color method of recording seismic information does not readily reflect changes in the frequency of the recorded seismic signal. This shortcoming has developed into a disadvantage inasmuch as it has now been observed that changes in record frequency or the frequency of the seismic signal are related to subsurface conditions which may have a bearing on petroleum or other mining exploration. Accordingly it is an object of this invention to provide a system in which the frequency changes of the seismic signals are recorded in a variable color form.

It is known that seismic impulses undergo changes in frequencies as they pass through various types of formations. Thence, highly resilient formations produce relatively little frequency change, while less dense formations may result in a considerable frequency change. Thus, a change of frequency recorded on a seismogram may indicate a change in material from one type of subsurface earth formation to another; and when laterally obtained records are compared, subsurface structures may be determined.

Briefly, this invention includes a system in which the zero crossings of the seismic signals are detected and the frequency of the occurrences of these zero crossings are displayed in a manner to present frequency variation in variable color form. The time between zero crossings is used to determine (1) the area to be exposed on a recording medium, and (2) the color of the exposure.

At this point, it is well to note that several terms in this description are assumed to have the following meanings. Thus, the term "frequency" is meant to be the number of times a signal waveform or seismic signal crosses the zero signal axis per unit of time. The term "zero crossings" refers to the crossing of the zero signal axis by the signal waveform. The term "positive zero crossing" refers to the crossing of the zero signal axis by the signal waveform in which the waveform changes from a negative to a positive value and the term "negative zero crossing" refers to the crossing of zero signals axis where the seismic signal changes from a positive to a negative value.

Figure 2:
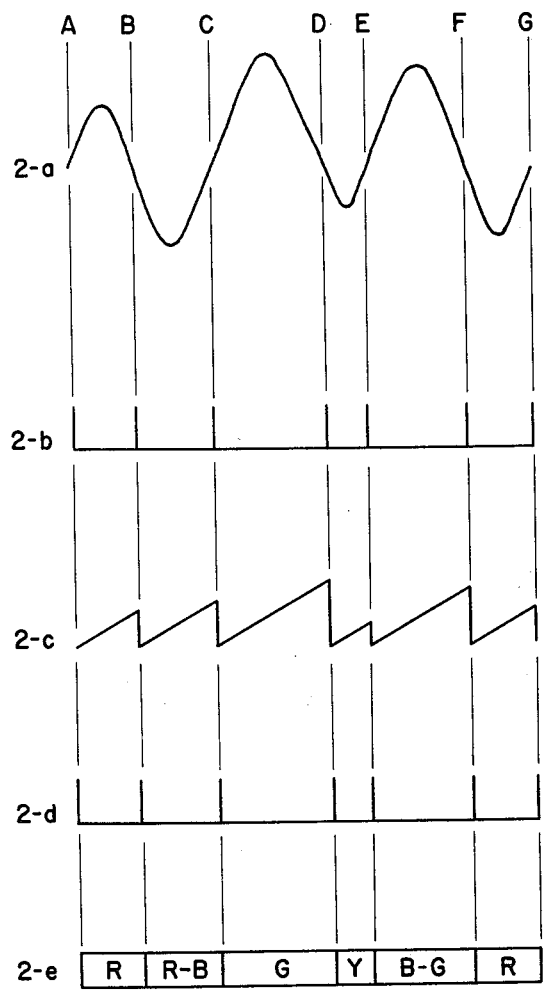

Other objects and a fuller understanding of this invention may be had by referring to the following description taken in conjunction with the accompanying drawing in which:

FIG. 1 illustrates in block diagram form an electronic system which can be used in the practice of this invention; and FIG. 2 is a graphic representation illustrating a comparison between a primary electrical signal 2–a, intermediate waves 2–b, 2–c and 2–d, and a simulated variable color recording 2–e.

Referring to the drawing, it may be seen that the components shown in this diagram include a seismic signal source 10, an amplifier 12, a zero crossing pulse former 14, a sawtooth generator 16, and an amplifier 18 which is electrically connected to galvanometer 20.

Seismic signal source 10 may include a signal received direct from the geophone which is used to detect the seismic disturbance or the seismic source may include any reproducible recorded seismic signal. The source will most commonly be a magnetic tape on which a seismic signal, which has been detected by a geophone, has been recorded. The seismic source is electrically connected to playback amplifier 12 which is used to amplify the signal. The output from the playback amplifier is electrically connected to a zero crossing pulse former 14 which is of a character to generate a sharp positive pulse for each zero crossing of the seismic signal. Zero crossing pulse former 14 may have a sharp pulse output for each zero crossing or it may have a sharp pulse output for only the negative zero crossings or only the positive zero crossings. For the purpose of this explanation it will be assumed that pulse former 14 generates a sharp positive pulse for each zero crossing. For a discussion of generations of pulses for zero crossings, negative zero crossings, and positive zero crossings, reference is made to pages 348 to 358 of Waveforms by Chance, Hughes, MacNichol, Sayre and Williams and published by Mc-Graw-Hill Book Company, Inc., New York, New York.

The output of signal zero crossing pulse former 14 is electrically connected to sawtooth generator 16. Sawtooth generator 16 is of a type to produce a linearly rising voltage upon receiving a pulse from zero crossing pulse former 14. The pulse also resets the sawtooth generator to zero voltage as well as triggering its rise. The output of sawtooth generator 16 is electrically connected to amplifiers 18 and 22 as well as to pulse differentiator amplifier 24. Amplifier 18 is electrically connected to galvanometer 20 which is a high frequency responsive galvanometer and has a frequency sensitivity as great as the frequency of the occurrences in a sawtooth waveform generated by sawtooth generator 16. In other words, the rotational position of the mirror of galvanometer 20 is at all times indicative of the instantaneous value of the sawtooth waveform.

Another high frequency responsive galvanometer 26 is electrically connected to amplifier 22. Galvanometer 26 may preferably be of the same type as galvanometer 20 and have the same responsive characteristics. The axes of rotation of mirrors of galvanometers 20 and 26 are essentially parallel.

Pulse differentiator amplifier 24 is electrically connected to the output of sawtooth generator 16. Differentiator amplifier 24 is of a character to have an output waveform which is a series of pulses with each pulse occurring at the occurrence of the peak of the sawtooth signal generated by sawtooth generator 16. The output of pulse differentiator amplifier 24 is then seen to be a series of equal amplitude sharp pulses which are spaced in accordance with the zero crossings of the seismic signal.

The output of pulse differentiator amplifier 24 is fed to a constant intensity flash tube 30. This tube is of a character to emit a flash of light upon receiving a pulse from pulse amplifier 24. Each flash is essentially of the same intensity.

The light flash from glow tube 30 passes through color filter 32. Color filter 32, as shown, is sectionalized and has four color sections which are yellow, red, blue or green. The light rays from the color filter 32 are essentially parallel and are directed toward the surface of the mirror of rotating galvanometer 26. It will be noted that preferably there will be no shields between the various sections of the color filter directing that particular color toward the mirror of galvanometer 20. Some diffusion of the colors is not harmful. The color is reflected from the surface of the mirror of galvanometer 26 through a light stop 34 having aperture 36 to the mirror of galvanometer 20. Aperture 36 is provided to control the cross-sectional area and shape of the color light reflected by galvanometer 26. The color passing through aperature 36 is determined by the rotational position of galvanometer mirror 26. As the position of mirror 26 is determined by the sawtooth waveform, the degree of rotation of the mirror of galvanometer 26 is dependent upon the frequency (or the distance or time between zero crossings) of the seismic signal. It is noted, however, that there is a small mechanical lag in the rotational position of the mirror with respect to the waveform.

Most seismic signals have frequencies in the range of about 10 cycles per second to about 100 cycles per second with the frequency range of interest normally being between about 25 cycles per second and 80 cycles per second. It is of course understood that the frequency range of interest may vary from area to area.

As an example, the color filter 32, mirror galvanometer 26 and aperture 36 are designed and positioned such that for about 25 cycles per second or less frequency, a yellow color will be reflected through aperture 36. For about 80 or more cycles, a green color will be reflected through aperture 36.

Recording drum 38 is provided with a color-sensitive recording medium. The axis of rotation of drum 38 is parallel to the axis of rotation of the mirror of galvanometer 20. Light stop 40 is positioned between galvanometer 20 and recording drum 34. When the mirror of galvanometer 20 and the mirror of galvanometer 26 are in their at-rest positions, that is, the position they would assume when receiving a zero voltage signal from sawtooth generator 16, stop 40 serves as a barrier of any light color beam reflected from the mirror of galvanometer 26 through aperture 36 to mirror galvanometer 20. When the galvanometers are in their at-rest positions, the leading edge of light, if light tube 30 were eliminated and as illustrated by dotted lines 37, would be even with the leading edge of stop 40 as indicated at 44. The rotation of recording drum 34 is synchronized with the speed of rotation of the mirrors of galvanometers 20 and 26. The speed of a point on the periphery of the drum 38 is equal to the speed of rotation of a light beam reflected from the mirror of galvanometer 20 at a point on the periphery of the drum 38; this is assuming that light source 30 remains on. Expressed differently, the speed of the sweep of the projection of aperture 36 on the recording medium, as mirror galvanometer 20 follows the rising ramp, is equal to the speed of the recording medium.

Attention will now be directed especially toward FIG. 2 and the operation of the apparatus as illustrated in FIG. 1. Seismic signals, illustrated in FIG. 2–a, which have preferably been corrected for static and dynamic errors from seismic source 10 are fed through playback amplifier 12. The amplifier signal is then fed to zero crossing pulse former 14. Zero crossing pulse former 14 generates a series of equal amplitude spikes as illustrated in FIG. 2–b which occur in time at each zero crossing of the seismic signal. In other words, for each zero crossing of the seismic signal, a positive spike or pulse is generated.

Each positive pulse triggers a linearly rising voltage ramp from sawtooth generator 16. The ramp continues to rise linearly until the sawtooth generator receives the next succeeding pulse which resets the generator voltage to zero and again triggers this upward rise. It is thus seen that each zero crossing of the seismic signal triggers a linearly rising voltage ramp which continues to rise until the next zero crossing pulse resets the ramp voltage to zero and again triggers its upward rise. The sawtooth signal is fed to amplifier 18, amplifier 22, and pulse differentiator 24.

Galvanometers 20 and 26 are of such frequency sensitivity that the rotation of their mirrors follows the sawtooth signal. In other words, the positions of the mirrors of galvanometers 20 and 26 are at all times directly representative of the sawtooth curve as illustrated in FIG. 2–c. When a sawtooth signal is at a zero position, the mirrors are in their at-rest position, and the rotation of the mirrors of the galvanometers 20 and 26 from their at-rest position is at all times proportional to the amplitude of the sawtooth signal 2–c. It is to be noted that the mirrors have a very small mechanical lag. Therefore at the instant the light flashes, the galvanometers are still at a rotational position representative of the peak of the sawtooth.

The speed of rotation of the mirror of galvanometer 20 and the mirror of galvanometer 26 as they follow the linearly rising ramps of the sawtooth signal are synchronized with the speed of rotation of drum 38. In other words, the speed of a point on the periphery of drum 38 is the same as the speed of a point on an arc formed by the rotation of a radius perpendicular to the plane of the mirror of galvanometer 20 and the radius being equal in length to the distance between the axis of rotation of the mirror and the periphery of the drum 34. Expressed another way, the speed of the recording medium is essentially equal to ωR, in which R is the distance between mirror galvanometer 20 and the recording medium and ω is the rotational speed of the mirror of mirror galvanometer 20. The mirrors of galvanometers 26 and 20 also rotate in unison as each follows sawtooth signal 2–c. Film drum 38 is driven by an adjustable speed motor 39 which has speed adjusting means 41. The speed of drum 38 can then be adjusted by adjusting the speed of motor 39 to obtain synchronization between the speed of the drum and the speed of rotation of the mirror of galvanometer 20. Alternatively the gain of D.C. amplifier 18 can be adjusted to vary the speed of rotation of mirror 20.

For each peak of the sawtooth signal as shown in FIG. 2–c a sharp, positive, constant amplitude spike is emitted by pulse differentiator 24. These constant amplitude spikes are illustrated in FIG. 2–d. The output signal from pulse differentiator 24 is fed to light source 30 which emits a flash of light for each spike illustrated in FIG. 2–d. Mirror galvanometers 20 and 26 are rotated from their at-rest position to a position representative of the peak of the sawtooth. In other words, for each zero crossing of the seismic signal the light source 30 emits a light which is reflected by the mirrors of galvanometers 20 and 26 to expose an area on the recording medium on drum 38. The amount of rotation of the mirrors of the galvanometers at each flash of light source 30 is a function of the distance between zero crossings or of the frequency of the seismic signal. It is seen that the lower the frequency, the greater the rotation of the mirrors of galvanometers 20 and 26 and the larger the area exposed on the film on drum 38. Likewise the greater the frequency, the less the rotation of the mirrors of galvanometers 20 and 26 and the smaller the area exposed on the film on drum 38.

By way of example, FIG. 2–e illustrates a variable color and variable area presentation of the frequency variation of the seismic waveform illustrated in FIG. 2–a. At zero crossing B the mirror galvanometers have followed the ramp illustrated in FIG. 2–c which is indicative of the time between zero crossings A and B. At zero crossing B light 30 flashes upon being energized by the sharp pulse in FIG. 2–d which compares in time to the crossing B. At the instant the light 30 flashes, the mirror galvanometer will have rotated such that the color red is reflected through aperture 36. The color red is reflected from mirror 20 and is recorded upon the recording medium as illustated by R in FIG. 2–e. The time between zero crossings B and C is further than the time between zero crossings A and B. Therefore, at zero crossing C the mirrors will have rotated such that when light 30 flashes, a red and blue partially diffused color will be reflected through aperture 36. This red and blue color will be recorded on the recording medium as indicated by R—B in FIG. 2–e. It is seen that this exposure of R—B is adjacent to the exposure indicated by R. There is no overlapping or blank space between the two exposed areas. This is of course a result of proper synchronization between the speed of the rotation of the mirror galvanometers and the speed of the recording medium.

The time between zero crossings C and D is greater than the time between zero crossings B and C. Therefore, the mirrors will have rotated a greater distance and the color green will be reflected through the aperture 36, thus exposing the recording medium with green as illustrated with G in FIG. 2–e. At zero crossing E the mirrors have rotated such that the film is exposed with a yellow color as indicated by Y in FIG. 2–e; at zero crossing F the mirrors have rotated such that the medium is exposed to the colors blue and green as illustrated by B—G; and at zero crossing G the mirrors will have rotated such that the recording medium is exposed with the red color as indicated by R. It is thus seen that both the area of the recording medium exposed at each zero crossing and the color making the exposure are a function of the time between zero crossings of the seismic signal. In other words, the presentation illustrated in FIG. 2–e is a variable area and variable color presentation of the frequency of the seismic signal.

It is clearly seen that a seismic section, presented in a variable color and area form, may be made using this invention. Color presentations prepared from seismic signals are arranged in a side-by-side relationship. The presentations are arranged in the same lateral order as the geophone locations corresponding to the seismic signals from which the color presentations were made. The spacing between the variable color presentation of the seismic signals is preferably proportional to the distances between the geophone locations so as to render the final product a reasonably accurate map of a vertical cross-section of the portion of the earth under study. It is thus seen that a seismic section can be prepared in a manner such that frequencies within the seismic spectrum are readily apparent.

It will be understod that the apparaturs and system contained in the above description are merely representative and illustrative and are not to be construed as limiting the invention and numerous modifications may be made therein without departing from the scope of the invention.

The invention claimed is:

1. A system for recording in variable color form a seismic signal having zero crossings across a base line comprising in combination means for detecting zero crossings of said signal, a light source of a character to emit a flash of light for each zero point detected, a mirror galvanometer means rotationally responsive to the time between said zero crossings with the mirror of said galvanometer being adapted to receive light from said light source, a color filter positioned between said mirror galvanometer and said light source, a second mirror galvanometer whose axis of rotation is parallel to the axis of rotation of said first galvanometer with said second mirror being rotationally responsive to the time between said crossings, the mirror of said second galvanometer being spaced from the mirror of said first galvanometer in position to receive the reflections of colored light from the mirror of said first galvanometer, an apertured light barrier between said galvanometer and said second galvanometer, said aperture so arranged with said galvanometers such that the color of the light passing through said aperture is a function of the rotation of said first galvanometer, a color-sensitive recording medium positioned to receive reflections of light from the mirror of said second galvanometer and means capable of moving said recording medium at a speed equal to the speed on the medium of the sweep of the projection of the reflection of said aperture from the mirror of said second galvanometer and a light shield between said recording medium and said second galvanometer with said shield positioned to block all the projection of said aperture's image reflected from said mirror from striking said recording medium only when said mirror is in its at-rest position.

2. A system for recording in variable color form a seismic signal having zero crossings across a base line comprising in combination means for detecting zero crossings of said signal, a light source of a character to emit a flash of light for each zero point detected, a mirror galvanometer means rotationally responsive to the distance between zero crossings with the mirror of said galvanometer being adapted to receive light from said light source, a color filter positioned between the said mirror of said galvanometer and said light source, a second mirror galvanometer whose axis of rotation of said mirror is parallel to the axis of said first mirror of said first galvanometer with said second mirror being rotationally responsive to the distance between said crossings, the mirror of said second galvanometer being spaced from the mirror of said first galvanometer and positioned to receive reflections of colored light from the mirror of said first galvanometer, a color-sensitive recording medium positioned to receive reflections of light from the mirror of said second galvanometer and means capable of moving said recording medium at a speed equal to $\Omega R$ where $R$ is equal to the distance between the mirror galvanometer of said second galvanometer and said recording medium and $\Omega$ is equal to the rotational speed of said mirror.

3. An apparatus for recording in variable color an electrical signal varying in frequency which comprises in combination a reflecting mirror galvanometer with its mirror rotationally responsive to the frequency of said electrical signal, a second reflecting mirror galvanometer with its mirror rotationally responsive to the frequency of said electrical signal and with the axis of rotation of its mirror being parallel to the axis of rotation of the mirror of said galvanometer with said second galvanometer being spaced from said first galvanometer, a light source of a character to emit a flash of light at each zero crossing of said electrical signal and spaced from the mirror of said first galvanometer with said mirror positioned to reflect light from said light source through said aperture to the mirror of said second galvanometer, a multi-color filter having each color of said filter representing a predetermined frequency and positioned between said light source and said mirror first galvanometer, a light barrier having an aperture disposed between said first mirror galvanometer and said second mirror galvanometer, a photographic recording medium spaced from said second mirror galvanometer, a light shield spaced between said second mirror and said recording medium and so spaced that when said first and said second mirrors are in their at-rest position light reflected through said aperture and from said second mirror will be blocked from said recording medium with the leading edge of the light beam being at the edge of said barrier, means capable of moving said photographic recording medium past said shield at a speed equal to the speed of the reflection of the projection of said aperture on said medium.

4. A method of recording in variable color from a seismic signal which oscillates by a reference voltage base line with variable determinable time intervals between crossings of said base line which comprises: detecting such crossings, recording the determinable time interval between successive crossings as independent areas on a recording medium, and controlling the size and color of each such area according to the time between said crossings.

5. A system of recording in variable color form on a color-sensitive recording medium a seismic signal which oscillates by a reference voltage base line with variable time intervals between crossings of said base line which comprises in combination: first means to determine the time interval between crossings; recording means to expose individual areas of said color-sensitive medium and control means responsive to said first means for varying the size of each of the individual areas exposed and the color of each such area as functions of the time intervals.

6. A system as defined in claim 5 with the improvement of providing means for exposing the areas as linearly adjacent areas.

7. A method of recording in variable color form a seismic signal which oscillates by a reference voltage base line and which has variable time intervals between detectable characteristics which comprises: detecting the occurrence of such characteristics; determining the time interval between occurrence of such characteristics; successively exposing independent areas of a color photosensitive recording medium; and controlling the size and color of each such area according to the measured time between corresponding successive characteristics.

8. A system for recording in variable color form on a recording medium a seismic signal which oscillates by a reference voltage base line which has variable time intervals between detectable characteristics comprising in combination: first means to detect the occurrence of such characteristics, second means to determine the time interval between characteristics, third means to successively expose individual areas of said recording medium, and control means responsive to said second means for varying the size of each of the individual areas exposed and the color of each such area according to the time between said successive corresponding characteristics.

9. A system of recording in variable color form a seismic signal which oscillates by a reference voltage base line and which has variable time intervals between significant points which comprises: measuring means for determining the time interval between significant points, recording means for recording the time between successive significant points as independent areas on a recording medium; and control means responsive to said measuring means to control the size and color of each such area as functions of the time between corresponding significant points.

10. A system as defined in claim 9 with the improvement of providing means for the recording of the areas as linearly adjacent areas.

11. A method of recording in variable color form a seismic signal which oscillates by a reference voltage base line and which has variable time intervals between detectable characteristics which comprises: detecting the occurrence of such characteristics; measuring the time interval between occurrences of such characteristics; repeatedly exposing successive areas of a moving recording medium; controlling the area of each exposure of the moving film in accordance with the measured time interval; and controlling the color of each such area in accordance with the corresponding measured time interval.

12. A method of recording in variable color form a seismic signal which oscillates by a reference voltage base line and which has variable time intervals between detectable characteristics which comprises: detecting in time sequence relationship the occurrence of such characteristics; successively exposing linearly adjacent areas of a color photosensitive recording medium; controlling the size of each of the areas exposed in accordance to the time between detected successive occurrences of said characteristics, and controlling the color of each area exposed in accordance to the time between detected successive occurrences of said characteristics.

13. A system for recording in variable color form a seismic signal which oscillates by a reference voltage base line and which has variable time intervals between detectable characteristics which comprises: first means for determining the time interval between occurrences of such characteristics; second means to successively expose individual areas on a recording medium; first control means responsive to said first means for controlling the size of each of the individual areas thus exposed according to the corresponding time interval determined by said first means, and second control means responsive to said first means for controlling the color of each such area according to the corresponding time interval determined by said first means.

14. A method of recording an electrical signal which oscillates by a reference base line and in which the time between detectable characteristics varies and which comprises: measuring the time interval between occurrence of desired detectable characteristics, recording the time between successive characteristics as an independent interval on a recording medium and controlling the size and color of such interval as functions of the time between said characteristics.

15. A system for recording in variable color form a seismic signal having detectable characteristics comprising in combination: means for detecting the detachable characteristics; means for measuring the time between successive characteristics; a light source of a character to emit a flash of light for each characteristic detected; a color sensitive recording medium positioned to receive light from said light source; means to expose individual areas on said recording medium; means to control the area of the recording medium exposed by each flash of light in accordance with the measured time interval; and means to control the color of the exposed area according to the measured interval.

16. A method of recording a seismic signal which has variable time intervals between successive detectable characteristics which comprises: detecting the desired detectable characteristics; measuring the time intervals between the occurrences of the characteristics; exposing individual areas of a moving recording medium representative of the measured time intervals; and controlling the color of each such exposure according to the values of the time intervals.

References Cited in the file of this patent
UNITED STATES PATENTS

| | | |
|---|---|---|
| 2,102,695 | Gieskieng | Dec. 21, 1937 |
| 2,186,157 | VanLeer | Jan. 9, 1940 |
| 2,875,017 | Reynolds | Feb. 24, 1959 |
| 2,912,673 | Groenendyke | Nov. 10, 1959 |
| 2,944,620 | Dyck | July 12, 1960 |
| 3,008,792 | Cox | Nov. 14, 1961 |